United States Patent
Yamamoto et al.

(10) Patent No.: US 10,697,492 B2
(45) Date of Patent: Jun. 30, 2020

(54) DOUBLE-ROW SELF-ALIGNING ROLLER BEARING

(71) Applicant: NTN CORPORATION, Osaka (JP)

(72) Inventors: Takashi Yamamoto, Kuwana (JP); Yasuyuki Inoue, Kuwana (JP); Kazumasa Seko, Kuwana (JP); Michio Hori, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/507,527

(22) Filed: Jul. 10, 2019

(65) Prior Publication Data

US 2019/0331164 A1    Oct. 31, 2019

Related U.S. Application Data

(63) Continuation of application No. PCT/JP2018/000379, filed on Jan. 10, 2018.

(30) Foreign Application Priority Data

Jan. 13, 2017 (JP) ................................ 2017-004019
Aug. 8, 2017 (JP) ................................ 2017-153392

(51) Int. Cl.
*F16C 23/08* (2006.01)
*F16C 19/38* (2006.01)
(Continued)

(52) U.S. Cl.
CPC ............ *F16C 19/38* (2013.01); *F16C 23/086* (2013.01); *F16C 33/36* (2013.01); *F16C 33/60* (2013.01);
(Continued)

(58) Field of Classification Search
CPC ........ F16C 19/38; F16C 23/086; F16C 33/36; F16C 2360/31
See application file for complete search history.

(56) References Cited

U.S. PATENT DOCUMENTS

| 2,008,336 A | 7/1935 | Palmgren |
| 7,918,649 B2 * | 4/2011 | Nakagawa ............. F16C 33/36 416/174 |

(Continued)

FOREIGN PATENT DOCUMENTS

| CN | 201347982 Y | 11/2009 |
| CN | 103586982 A | 2/2014 |

(Continued)

OTHER PUBLICATIONS

Translation by WIPO of the International Preliminary Report on Patentability dated Jul. 25, 2019 in corresponding International Patent Application No. PCT/JP2018/000379.

(Continued)

*Primary Examiner* — Phillip A Johnson

(57) ABSTRACT

A double-row self-aligning roller bearing has rollers interposed, in two rows aligned in a bearing width direction, between an inner ring and an outer ring. The outer ring has a spherical raceway surface. Each of the rollers has an outer circumferential surface having a cross-sectional shape that matches the raceway surface of the outer ring. The rollers have lengths equal to each other and maximum diameters equal to each other, and have different distances from centers of the roller lengths to positions at which the maximum diameters are obtained.

8 Claims, 11 Drawing Sheets

(51) Int. Cl.
*F16C 33/36* (2006.01)
*F16C 33/60* (2006.01)
(52) U.S. Cl.
CPC ...... *F16C 2240/34* (2013.01); *F16C 2360/31* (2013.01)

(56) References Cited

U.S. PATENT DOCUMENTS

| | | | |
|---|---|---|---|
| 7,922,396 B2 * | 4/2011 | Mori | F03D 80/70 384/558 |
| 8,967,878 B2 * | 3/2015 | Lippert | F16C 19/383 384/558 |
| 9,863,471 B2 | 1/2018 | Loof et al. | |
| 2007/0127858 A1 | 6/2007 | Nakagawa et al. | |
| 2014/0050434 A1 | 2/2014 | Lippert et al. | |
| 2014/0112607 A1 | 4/2014 | Silverio et al. | |
| 2016/0298687 A1 | 10/2016 | Loof et al. | |

FOREIGN PATENT DOCUMENTS

| | | |
|---|---|---|
| CN | 203948457 U | 11/2014 |
| CN | 106151264 A | 11/2016 |
| JP | 2004-19731 | 1/2004 |
| JP | 2005-207517 | 8/2005 |
| JP | 2008-075758 A | 4/2006 |
| WO | WO 2005/050038 A1 | 6/2005 |

OTHER PUBLICATIONS

International Search Report dated Apr. 17, 2018 in corresponding International Patent Application No. PCT/JP2018/000379.
First Office Action dated Apr. 28, 2020 in Chinese Patent Application No. 201880006598.1

* cited by examiner

DOUBLE-ROW SELF-ALIGNING ROLLER BEARING

CROSS REFERENCE TO THE RELATED APPLICATION

This application is a continuation application, under 35 U.S.C. § 111(a), of international application No. PCT/JP2018/000379, filed Jan. 10, 2018, which claims priority to Japanese patent application No. 2017-004019, filed Jan. 13, 2017, and Japanese patent application No. 2017-153392, filed Aug. 8, 2017, the disclosure of which are incorporated by reference in their entirety into this application.

BACKGROUND OF THE INVENTION

Field of the Invention

The present invention relates to a double-row self-aligning roller bearing to be applied to a usage in which unequal loads are applied to rollers in two rows aligned in a bearing width direction, for example, to a bearing that supports a main shaft of a wind power generator or industrial machinery, or the like.

Description of Related Art

On a bearing that supports a main shaft of a wind power generator, an axial load due to wind force acts in addition to a radial load due to the weights of each blade and a rotor head. In the case where the main shaft supporting bearing is a double-row self-aligning roller bearing 41 as shown in FIG. 14, out of rollers 44 and 45 in two rows interposed between an inner ring 42 and an outer ring 43, only the rollers in one row at the rear side with respect to an axial load Fa mainly receive the axial load Fa. That is, whereas the rollers 45 in the one row receive both a radial load and an axial load, the rollers 44 in the other row receive almost only the radial load. Thus, the rollers 45 in the row that receives the axial load have higher contact surface pressure than the rollers 44 in the row that receives only the radial load. As a result, surface damage or wear of rolling surfaces of the rollers 45 and a raceway surface 43a of the outer ring 43 occurs easily, and thus the rolling life thereof is short. Therefore, the substantial life of the entire bearing is determined by the rolling life of the row of the rollers 45 that receive the axial load.

For the above problem, it has been proposed that, as in a double-row self-aligning roller bearing 51 shown in FIG. 15, lengths L1 and L2 of rollers 54 and 55 in two rows interposed between an inner ring 52 and an outer ring 53 are made different from each other, thereby making the load capacity of the rollers 55 in the row that receives an axial load larger than the load capacity of the rollers 54 in the row that hardly receives any of the axial load (Patent Document 1). By setting the roller lengths L1 and L2 such that the load capacities of the rollers 54 and 55 in the respective rows have appropriate magnitudes, the rolling life of the rollers 54 and 55 in the respective rows becomes substantially the same, so that the substantial life of the entire bearing can be improved.

Moreover, it has been proposed, as in a double-row self-aligning roller bearing 61 shown in FIG. 16, contact angles θ1 and θ2 of rollers 64 and 65 in two rows interposed between an inner ring 62 and an outer ring 63 are made different from each other, thereby allowing the rollers 65 having a larger contact angle θ2 to receive a large axial load (Patent Document 2). By setting the contact angles θ1 and θ2 such that the load capacities of the rollers 64 and 65 in the respective rows have appropriate magnitudes, the rolling life of the rollers 64 and 65 in the respective rows becomes substantially the same, so that the substantial life of the entire bearing can be improved.

Patent Document 2 states that lengths L1 and L2 of the rollers 64 and 65 in the respective rows are equal to each other. Although not described in particular, it is considered that the rollers 64 and 65 in the respective rows also have maximum diameters D1max and D2max equal to each other and are symmetrical rollers. A symmetrical roller is a roller having a symmetrical shape in which the position at which the maximum diameter thereof is obtained is at the center of the roller length.

RELATED DOCUMENT

Patent Document

[Patent Document 1] WO2005/050038
[Patent Document 2] US Patent Application Publication No. 2014/0112607

SUMMARY OF THE INVENTION

As described above, by making the lengths L1 and L2 of the rollers 54 and 55 in the two rows different from each other as shown in FIG. 15, the load capacities of the rollers 55 in the row that receives the axial load are made larger, whereby the substantial life of the entire bearing can be improved. However, with this method, in the case where the length L2 of the rollers 55 that receive the axial load are excessively increased, there is concern that the bearing width exceeds a specified value determined in dimensional standards for bearings for example, ISO standard: JIS B 1512). In addition, in the case where the length L1 of the rollers 54 that receive almost no axial load is extremely shortened, the rollers 54 each have a shape in which the length L1 is too short as compared to the maximum diameter D1max, so that rotation stability may become lacking.

Therefore, to improve the substantial life of the entire bearing, a method in which the contact angles θ1 and θ2 of the rollers 64 and 65 in the respective rows are made different from each other as shown in FIG. 16 has been studied. However, it has been found that, with this method, in the case where both the lengths L1 and L2 and the maximum diameters D1max and D2max of the rollers 64 and 65 in the respective rows are equal to each other, and the rollers 64 and 65 in the respective rows are symmetrical rollers, it is difficult to set the contact angles θ1 and θ2 such that the load capacities of the rollers 64 and 65 have optimum values, without changing the positions or the lengths of the rollers 64 and 65 in the respective rows.

An object of the present invention is to provide a double-row self-aligning roller bearing that is suited to be used in a usage in which an axial load and a radial load are received and loads having magnitudes different from each other act on rollers in two rows aligned in an axial direction, that allows contact angles of rollers in respective rows to be easily set to appropriate angles, and that can ensure a high load capacity and have extended life.

A double-row self-aligning roller bearing of the present invention includes: an inner ring; an outer ring having a spherical raceway surface; and rollers in two rows juxtaposed to each other in a bearing width direction and interposed between the inner ring and the outer ring, each of the rollers in the two rows having an outer circumferential surface having a cross-sectional shape that matches the raceway surface of the outer ring, in which the rollers in the two rows have lengths equal to each other and maximum diameters equal to each other, and have different distances from centers of the roller lengths to positions at which the maximum diameters are obtained.

In the case where the maximum diameter of a roller is located at the center of the roller length, the contact angle of the roller is an angle formed by a plane passing through the center of the roller length and a plane perpendicular to the bearing central axis. In the case where the position at which the maximum diameter of a roller is obtained is shifted from the center of the roller length, the contact angle of the roller is an angle formed by a plane perpendicular to the bearing central axis and a plane passing through a position slightly shifted from the center of the roller length toward the position at which the maximum diameter is obtained. By making the distances from the centers of the roller lengths to the positions at which the maximum diameters are obtained in the rollers in the two rows different from each other, the position at which the maximum diameter of each roller is obtained can be shifted from the center of the roller length, thereby changing the contact angle without changing the position of the roller. By adjusting the distances from the centers of the roller lengths to the positions at which the maximum diameters are obtained in the rollers in both rows, optimum contact angles can be easily set.

In the case of using the double-row self-aligning roller bearing under a condition that an axial load and a radial load act, the rollers having a larger contact angle are caused to bear substantially the entirety of the axial load and part of the radial load, and the rollers having a smaller contact angle are caused to bear the rest of the radial load. By sharing and bearing the axial load and the radial load at such a share ratio by the rollers in the two rows, the contact surface pressures on the rollers in both rows can be made equal to each other. Accordingly, a high load capacity can be ensured in the entire bearing, and the substantial life of the entire bearing can also be improved.

In the present invention, in one row of the two rows, the position at which the maximum diameter is obtained may be shifted to an inner side in the bearing width direction with respect to the center of the roller length.

In this case, when a load is applied to the rollers, a load toward a spacer or an intermediate flange of the inner ring between the rollers in the two rows is generated. Thus, end faces of the rollers are assuredly guided by the intermediate flange or the spacer, and the rollers can stably rotate.

In the present invention, of the rollers in the two rows, the rollers having the longer distance from the center of the roller length to the position at which the maximum diameter is obtained may have a larger contact angle than the rollers having the shorter distance.

As each distance from the center of the roller length to the position at which the maximum diameter is obtained is longer, a greater load toward the intermediate flange or the spacer is generated when a load is applied to the rollers. A roller having a larger contact angle tends to unstably rotate. By increasing the distance of the rollers having a larger contact angle, rotation of the rollers can be stabilized.

The double-row self-aligning roller bearing is suited to support a main shaft of a wind power generator.

On the double-row self-aligning roller bearing that supports the main shaft of the wind power generator, a radial load due to the weights of blades and a rotor head and an axial load due to wind force act. One roller row, of the rollers in the two rows aligned in the bearing width direction, receives both the radial load and the axial load, and the rollers in the other row receive almost only the radial load. In this case, by using rollers having a larger contact angle as the rollers in the row that receives the axial load and rollers having a smaller contact angle as the roller in the row that receives almost only the radial load, the contact surface pressures on the rollers in the respective left and right rows can be made substantially equal to each other.

The double-row self-aligning roller bearing may further include retainers configured to retain the rollers in the respective rows, in which each retainer includes an annular portion that has an annular shape and is configured to guide axially inner end faces of the rollers in the row, and a plurality of pillar portions that extend in an axial direction from the annular portion and that are provided at predetermined intervals along a circumferential direction, pockets configured to retain the rollers are provided between those pillar portions, and one of the retainers configured to retain the rollers having the longer distance from the center of the roller length to the position at which the maximum diameter is obtained has an inclination angle by which a radially outer surface of each pillar portion is inclined radially inward from a proximal end side toward a distal end side.

The predetermined intervals recited above refer to intervals optionally determined through design or the like.

Since the retainer that retains the rollers having the longer distance from the center of the roller length to the position at which the maximum diameter is obtained has an inclination angle at which a radially outer surface of each pillar portion is inclined radially inward from a proximal end side toward a distal end side as described above, the pocket surfaces of the retainer can hold the maximum diameter positions of the rollers. Thus, the attitude stability of the rollers having the longer distance to the position at which the maximum diameter is obtained is not deteriorated, and it is also possible to easily fit the rollers.

Each of the rollers may have a DLC coating on a roller rolling surface thereof.

DLC is an acronym for diamond-like carbon.

In this case, wear of the roller rolling surfaces and the respective raceway surfaces of the inner ring and the outer ring hardly occurs, and the wear resistance of each roller can be improved as compared to rollers not having the DLC coating.

Each of the rollers may have a crowning at an end portion of a roller rolling surface thereof. In this case, edge stress can be relaxed.

The inner ring may include an intermediate flange that is provided on an outer circumferential surface of the inner ring between the rollers in the two rows and configured to guide the rollers in the two rows, and small flanges that are provided at opposite ends of the outer circumferential surface, respectively, and that face axially outer end faces of the rollers in the respective rows, and one small flange of the respective small flanges of the inner ring, that faces the axially outer end faces of the rollers having the longer distance from the center of the roller length to the position at which the maximum diameter is obtained has an insertion slot for inserting the rollers into the bearing. Since such an insertion slot is provided, fittability of the rollers having the longer distance to the position at which the maximum diameter is obtained, into the bearing can be further improved.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
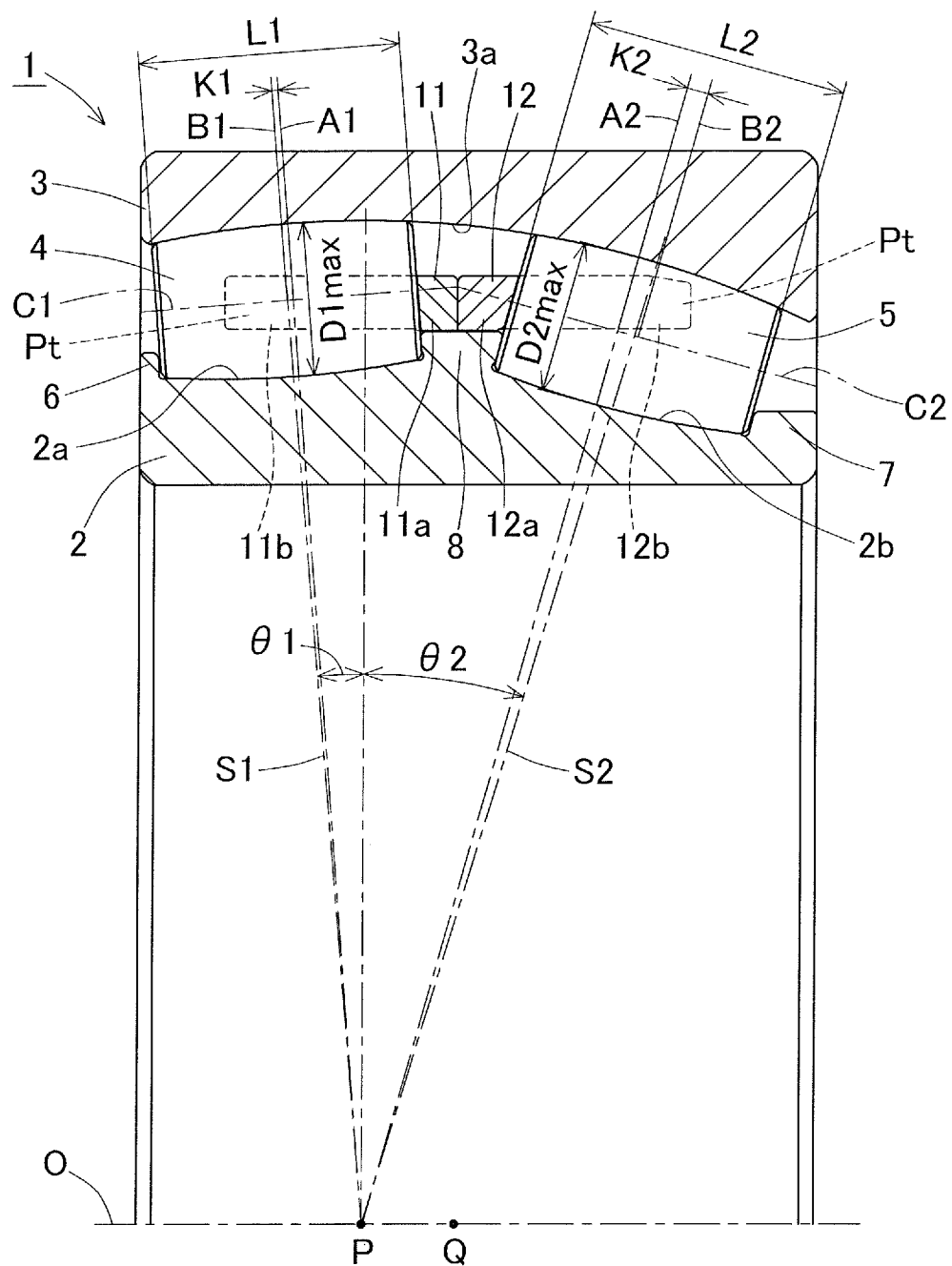
FIG. 1 is a cross-sectional view of a double-row self-aligning roller bearing according to a first embodiment of the present invention.

A first embodiment of the present invention will be described with reference to FIG. 1.

In a double-row self-aligning roller bearing 1, rollers 4 and 5 in left and right two rows juxtaposed to each other in a bearing width direction are interposed between an inner ring 2 and an outer ring 3. The outer ring 3 has a spherical raceway surface 3a, and the rollers 4 and 5 in the left and right rows each have an outer circumferential surface having a cross-sectional shape that matches the raceway surface 3a of the outer ring 3. In other words, the outer circumferential surfaces of the rollers 4 and 5 are rotation curved surfaces obtained by rotating, about center lines C1 and C2, a circular arc extending along the raceway surface 3a of the outer ring 3. On the inner ring 2, raceway surfaces 2a and 2b in double rows having cross-sectional shapes along the outer circumferential surfaces of the rollers 4 and 5 in the respective left and right rows are formed. Flanges (small flanges) 6 and 7 are provided at opposite ends of the outer circumferential surface of the inner ring 2, respectively. An intermediate flange 8 is provided on a center portion of the outer circumferential surface of the inner ring 2, that is, between the rollers 4 in the left row and the rollers 5 in the right row. The rollers 4 and 5 in the respective left and right rows are retained by retainers 11 and 12, respectively.

The retainer 11 for the left row includes: an annular portion 11a that has an annular shape and guides the axially inner end faces of the rollers 4 in the left row; and a plurality of pillar portions 11b that extend in the axial direction from the annular portion 11a and are provided at predetermined intervals along the circumferential direction. Pockets Pt for retaining the rollers 4 are provided between those pillar portions. The retainer 12 for the right row includes: an annular portion 12a that has an annular shape and guides the axially inner end faces of the rollers 5 in the right row; and a plurality of pillar portions 12b that extend in the axial direction from the annular portion 12a and are provided at predetermined intervals along the circumferential direction. Pockets Pt for retaining the rollers 5 are provided between those pillar portions.

Figure 2:
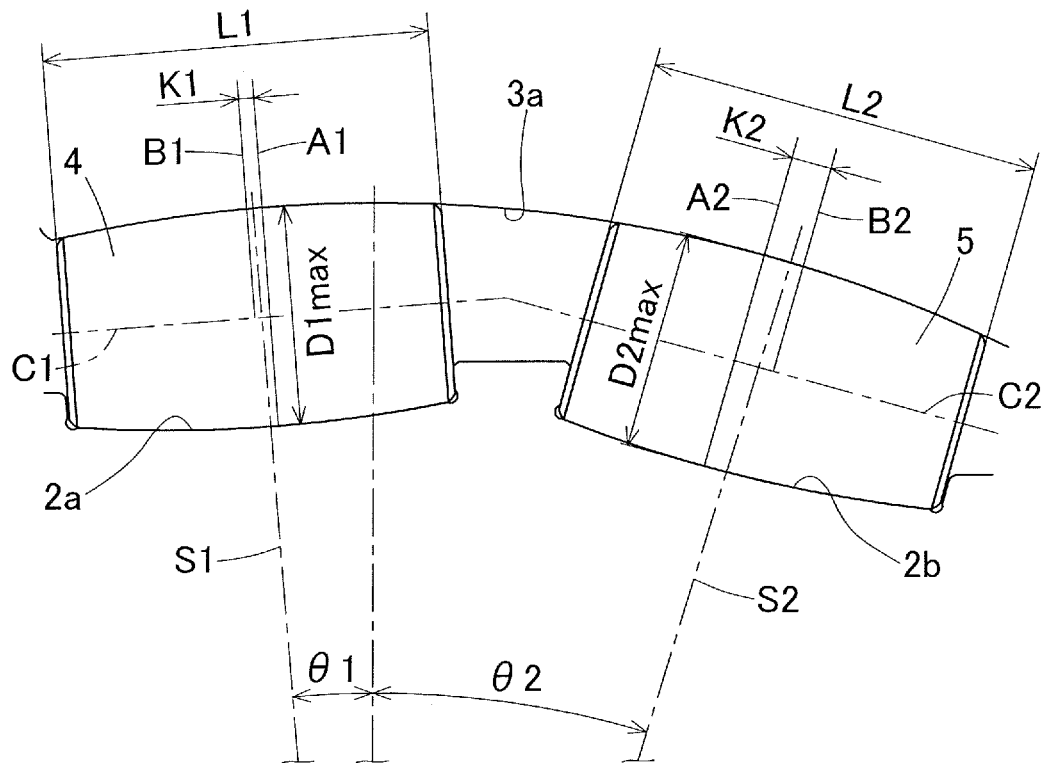
FIG. 2 is an explanatory diagram exaggeratedly representing the shapes of rollers of the double-row self-aligning roller bearing.

The rollers 4 in the left row and the rollers 5 in the right row have lengths L1 and L2, along the center lines C1 and C2, equal to each other, and also have maximum diameters D1max and D2max equal to each other. However, both the rollers 4 and 5 in the respective left and right rows are asymmetrical rollers. The asymmetrical rollers are rollers having asymmetrical shapes in which positions A1 and A2 at which the maximum diameters D1max and D2max are obtained are shifted from centers B1 and B2 of the roller lengths as exaggeratedly shown in FIG. 2. In the case of this embodiment, the position A1 at which the maximum diameter D1max of the rollers 4 in the left row is obtained is at the right side, that is, at the inner side in the bearing width direction, with respect to the center B1 of the roller length, and the position A2 at which the maximum diameter D2max of the rollers 5 in the right row is obtained is at the left side, that is, at the inner side in the bearing width direction, with respect to the center B2 of the roller length.

Since the rollers 4 and 5 are the asymmetrical rollers as described above, the contact angles θ1 and θ2 can be changed without changing the positions or the lengths of the rollers 4 and 5, in contrast to symmetrical rollers (not shown) in each of which the position at which the maximum diameter is obtained is at the center of the roller length. By adjusting distances K1 and K2 from the centers B1 and B2 of the roller lengths to the positions A1 and A2 at which the maximum diameters D1max and D2max are obtained, optimum contact angles θ1 and θ2 can be set.

When the positions A1 and A2 at which the maximum diameters D1max and D2max of the rollers 4 and 5 in the respective left and right rows are obtained are located at the inner side in the bearing width direction with respect to the centers B1 and B2 of the roller lengths as in this embodiment, the contact angles θ1 and θ2 are smaller than those in the case where each roller is a symmetrical roller. By shifting the positions A1 and A2, at which the maximum diameters of the rollers 4 and 5 in the respective rows are obtained, to the inner side in the bearing width direction with respect to the centers B1 and B2 of the roller lengths, a load toward the intermediate flange 8 is generated when a load is applied to the rollers 4 and 5. Thus, the end faces of the rollers 4 and 5 are assuredly guided by the intermediate flange 8, and the rollers 4 and 5 can stably rotate.

Moreover, in this embodiment, the contact angle θ2 of the rollers 5 having the distance K2 that is larger when the distances K1 and K2 from the centers B1 and 132 of the roller lengths to the positions A1 and A2 at which the maximum diameters are obtained are compared to each other, is set so as to be larger than the contact angle θ1 of the rollers 4 having the smaller distance K1. Thus, when a load is applied to the respective rollers 4 and 5, a greater load toward the intermediate flange 8 is generated at the rollers 5 having the larger contact angle θ2, than at the rollers 4 having the smaller contact angle θ1. A roller having a larger contact angle tends to unstably rotate. However, by causing a greater load to be generated toward the intermediate flange 8 as described above, rotation of the rollers 5 having the larger contact angle θ2 can be stabilized.

In FIG. 1, lines of action S1 and S2 which define the contact angles θ1 and θ2 of the rollers 4 and 5 in the respective rows intersect each other at a point P on a bearing central axis O. Thus, it is possible for the inner ring 2 and the rollers 4 and 5 to make an aligning operation along the raceway surface 3a of the outer ring 3. The position in the bearing width direction of the point P is shifted to the side at which the rollers 4 having a smaller contact angle θ1 are present, with respect to a center position Q in the bearing width direction of the intermediate flange 8. The lines of action S1, S2 are defined as lines along which a resultant force of forces acting on contact portions between the rollers 4, 5 and the inner and outer rings 2, 3 acts.

Figure 3:
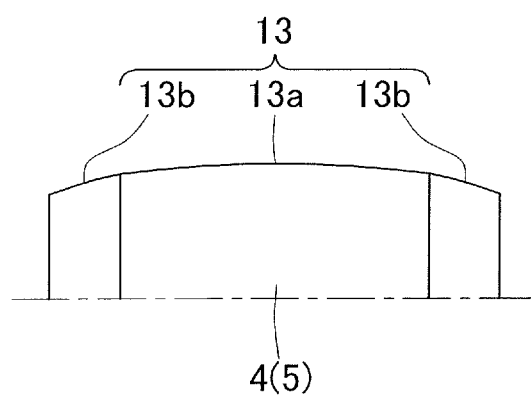
FIG. 3 is an explanatory diagram exaggeratedly representing the cross-sectional shape of the rolling surface of the roller of the double-row self-aligning roller bearing.

As shown in FIG. 3, crownings may be provided on the rolling surfaces 13 of either of the rollers 4 or 5 in the left or right rows or the rolling surfaces 13 of both rollers 4 and 5. By providing the crownings, the radii of curvature of both end portions 13b and 13c of each rolling surface 13 are made smaller than that of a center portion 13a of the rolling surface 13. The shape of each crowning is, for example, a logarithmic curve. The shape of each crowning may be a straight line, a single circular arc, or a shape obtained by combining a plurality of circular arcs, other than the logarithmic curve. By providing crownings at opposite ends of the rolling surfaces 13 of the rollers 4 and 5 as described above, surface pressures on both end portions 13b and 13c of the rolling surfaces 13 of the rollers 4 and 5 at which a sliding velocity is high are decreased, and the absolute value of a PV value (surface pressure×sliding velocity) is reduced, so that friction can be reduced. In particular, crownings are preferably provided to the rollers 5 in the right row in FIG. 1 which receives an axial load.

The double-row self-aligning roller bearing 1 having this configuration is used in a usage in which an axial load and a radial load are received and loads having magnitudes different from each other act on left and right roller rows, for example, as a bearing for supporting a main shaft of a wind power generator. In this case, the double-row self-aligning roller bearing 1 is mounted such that the rollers 4 in the left row are located at the side closer to revolving blades (the front side) and the rollers 5 in the right row are located at the side farther from the revolving blades (the rear side). Thus, the rollers 5 in the right row having the larger contact angle θ2 bear substantially the entirety of an axial load and part of a radial load, and the rollers 4 in the left row having the smaller contact angle θ1 bear the rest of the radial load.

By appropriately setting the contact angles θ1 and θ2 of the rollers 4 and 5, the load can be shared at a ratio corresponding to the load capacities of the rollers 4 and 5 in the respective left and right rows. As a result, the surface pressures on the rollers 4 and 5 in the respective left and right rows become equal to each other. Accordingly, a high load capacity can be ensured in the entire bearing, and the substantial life of the entire bearing can also be improved. Since the rollers 4 and 5 are the asymmetrical rollers, optimum contact angles θ1 and θ2 can be easily set without changing the positions or the lengths of the rollers 4 and 5.

Other embodiments will be described.

In the following description, in each embodiment, portions corresponding to the matters described in the previously described embodiments are designated by the same reference numerals, and the redundant description thereof is omitted. When only a part of a configuration is described, the remaining part of the configuration is the same as that of the previously described embodiment unless otherwise specified. The same advantageous effects are achieved by the same configuration. In addition to the combinations of portions described specifically in each embodiment, it is also possible to partially combine the embodiments unless any problem is particularly posed due to the combination.

Retainer 12A with Inclination Angle

Figure 4:
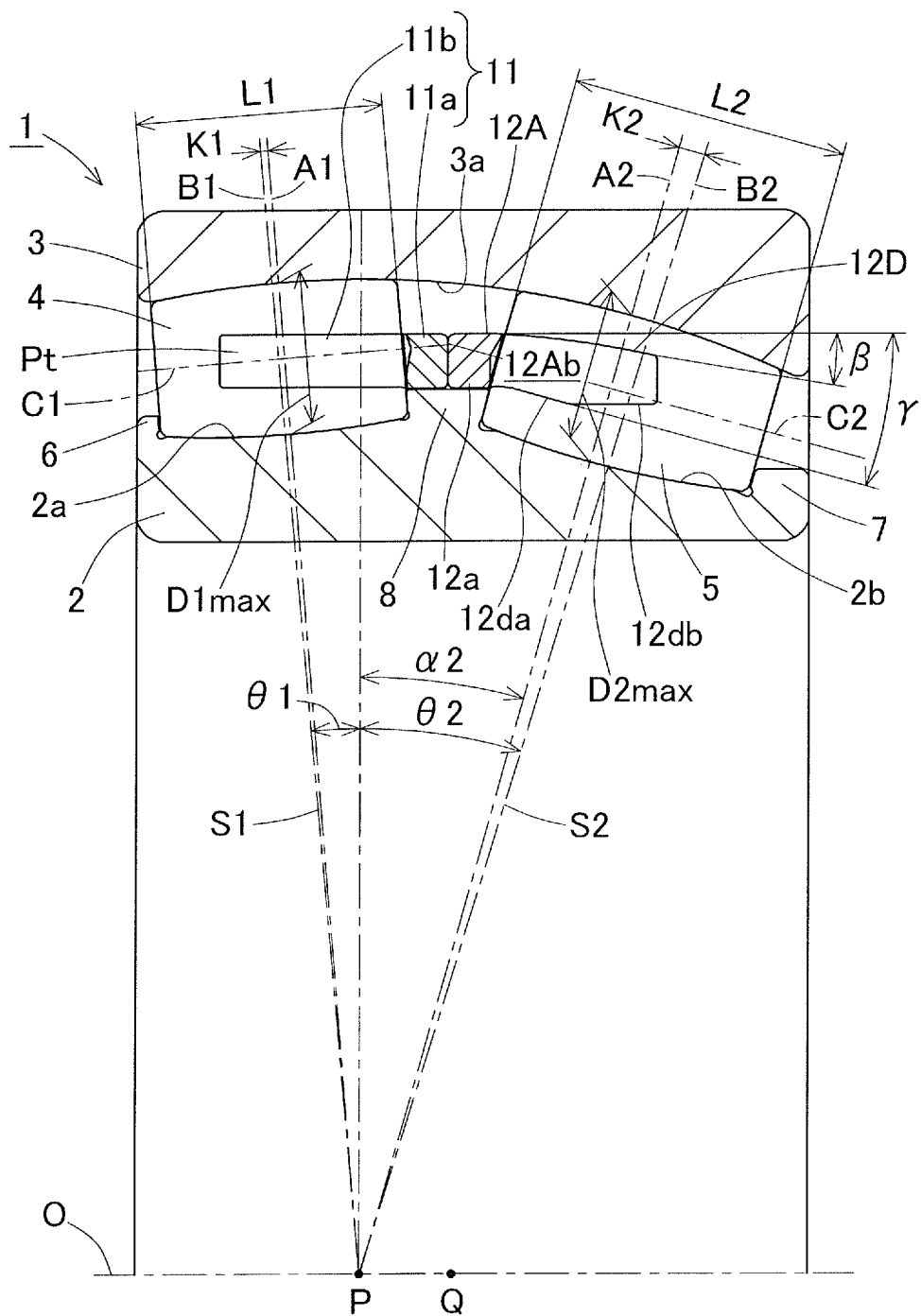
FIG. 4 is a cross-sectional view of a double-row self-aligning roller bearing according to a second embodiment of the present invention.

A double-row self-aligning roller bearing according to a second embodiment will be described with reference to FIG. 4.

The double-row self-aligning roller bearing 1 includes a retainer 12A with an inclination angle. The retainer 12A for the right row shown in FIG. 4 is a retainer for retaining the rollers 5 having the larger distance K2 from the center B2 of the roller length to the position A2 at which the maximum diameter is obtained. The retainer 12A has an inclination angle β at which a radially outer surface 12D of each pillar portion 12Ab is inclined radially inward from a proximal end side toward a distal end side. The inclination angle β is an angle relative to the bearing central axis O. The inclination angle β of the retainer 12A is set within a range of greater than zero and not greater than a maximum diameter angle α2 of the rollers 5 having the larger distance K2 ($0<\beta\leq\alpha2$). The maximum diameter angle α2 is an inclination angle, relative to a plane perpendicular to the bearing central axis O, at the position A2 at which the maximum diameter D2max of the rollers 5 in the right row is obtained.

The radially inner surface of each pillar portion 12Ab in the retainer 12A for the right row in this example has an inclined surface portion 12da and a flat surface portion 12db connected to the inclined surface portion 12da. The inclined surface portion 12da extends from the proximal end side of the radially inner surface of the pillar portion 12Ab to a position near the middle in the axial direction of the radially inner surface, and has an inclination angle γ at Which the inclined surface portion 35Ab is inclined radially inward from the proximal end side to the position near the middle in the axial direction. The inclination angle γ is also an angle relative to the bearing central axis O, and is set so as to be not less than the inclination angle β ($\gamma\geq\beta$). In this example, the inclination angle γ is set so as to be greater than the inclination angle β by several degrees. However, the relationship between these inclination angles is not limited to this relationship (γ≥β). The flat surface portion 12*db* is a flat surface that extends in the axial direction from the distal edge of the inclined surface portion 12*da* and is parallel to the bearing central axis O. In the retainer 11 for the left row, the radially outer surfaces and the radially inner surfaces of the pillar portions 11*b* do not have any inclination angle, that is, are parallel to the bearing central axis O.

Since the retainer 12A for the right row has the above-described inclination angle β, the pocket surfaces of the retainer 12A can hold the maximum diameter positions of the rollers 5. Thus, the attitude stability of the rollers 5 in the right row is not deteriorated, and it is also possible to easily fit the rollers 5.

Crowning Cw

Figure 5:
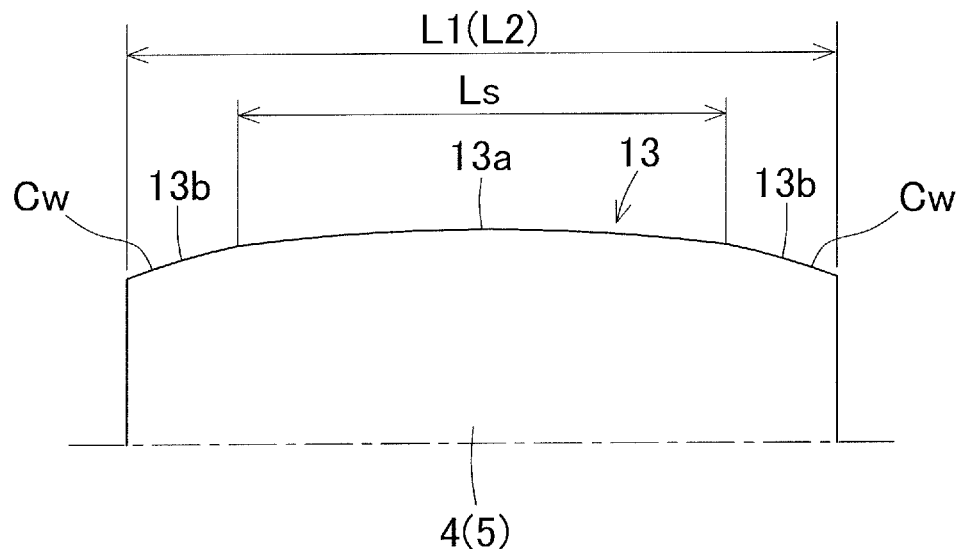
FIG. 5 is an enlarged cross-sectional view showing crownings, etc., of a roller of a double-row self-aligning roller bearing according to a third embodiment of the present invention.

In a double-row self-aligning roller bearing according to a third embodiment, as shown in FIG. 5, the rollers 4 and 5 in the respective left and right rows may each have crownings Cw at the end portions 13*b* and 13*c* of the roller rolling surface 13 thereof. As each crowning Cw in this example, a complex R crowning that increases a drop amount by making the end portion 13*b* or 13*c* of the roller rolling surface 13 smaller than a reference R of the roller rolling surface 13 is used. A length Ls of a roller center portion 13*a* at which no crowning Cw is provided (hereinafter, referred to as "straight length") may be 50% to 70% and preferably 60% of a roller overall length L1 (L2).

Figure 6:
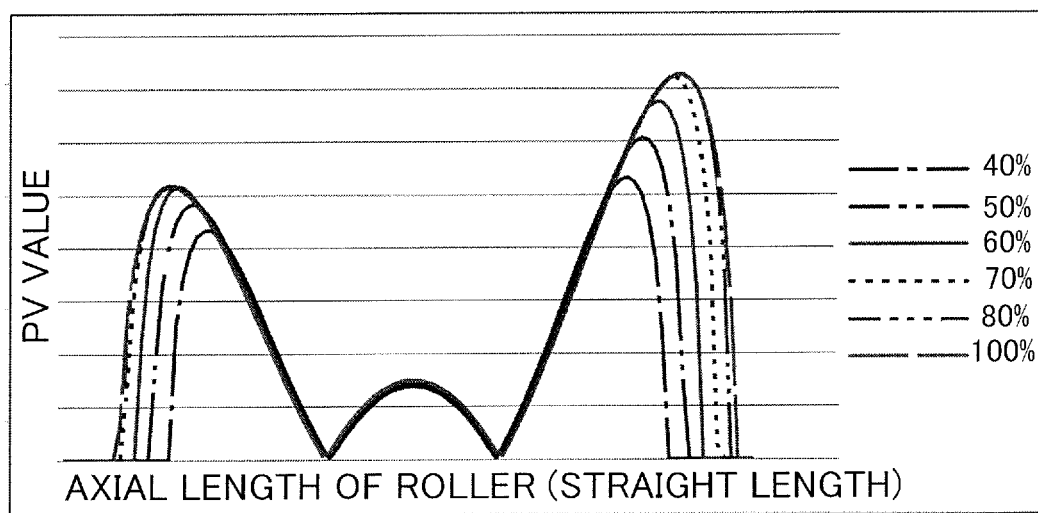
FIG. 6 is a diagram showing a relationship between a straight length and a PV value of the roller.
Figure 7:
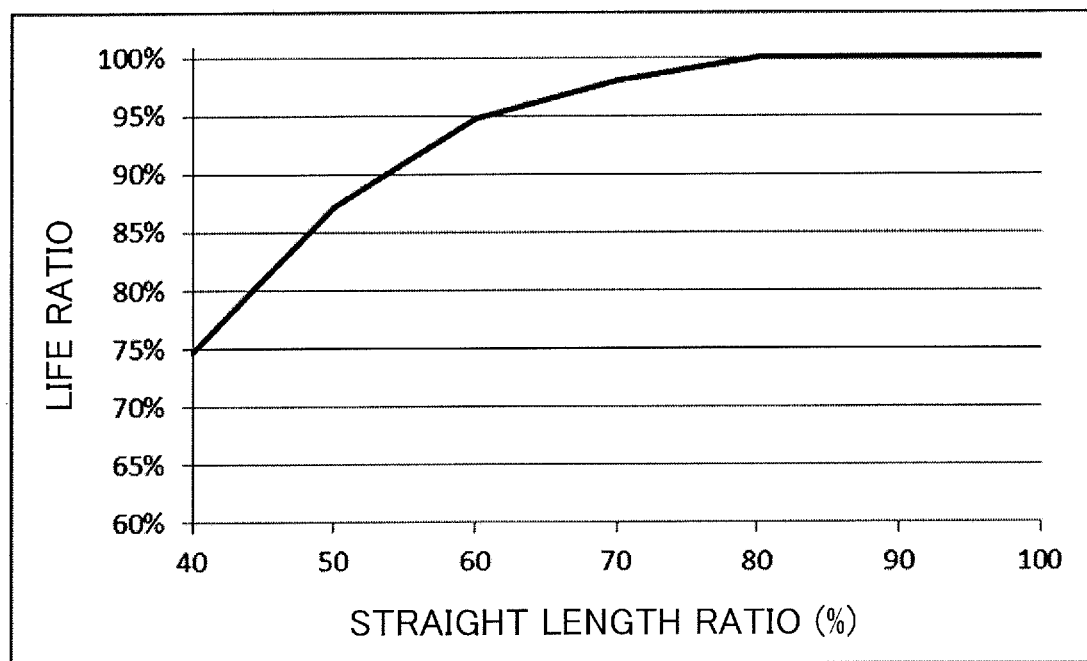
FIG. 7 is a diagram showing a relationship between the straight length of the roller and bearing life.

FIG. 6 is a diagram showing a relationship between a straight length and a PV value (surface pressure×sliding velocity) when an average wind load is applied to a double-row self-aligning roller bearing for supporting a windmill main shaft. FIG. 7 is a diagram showing a relationship between the straight length and bearing life. From FIG. 6, it is understood that the shorter the straight length is, the lower the PV value is. From FIG. 7, it is understood that, when the straight length is less than 60% of the roller overall length, the life reduction rate exceeds 5% as compared to the case where no crowning is provided (straight length=100%). Therefore, the straight length is preferably 60% of the roller overall length.

In the case where the rollers 4 and 5 in the respective rows have such crownings Cw (FIG. 5), edge stress can be relaxed. Instead of the complex R crowning, a logarithmic crowning in which the end portion 13*b* or 13*c* of the roller rolling surface 13 is represented by a logarithmic curve may be used.

DLC Coating

Figure 8:
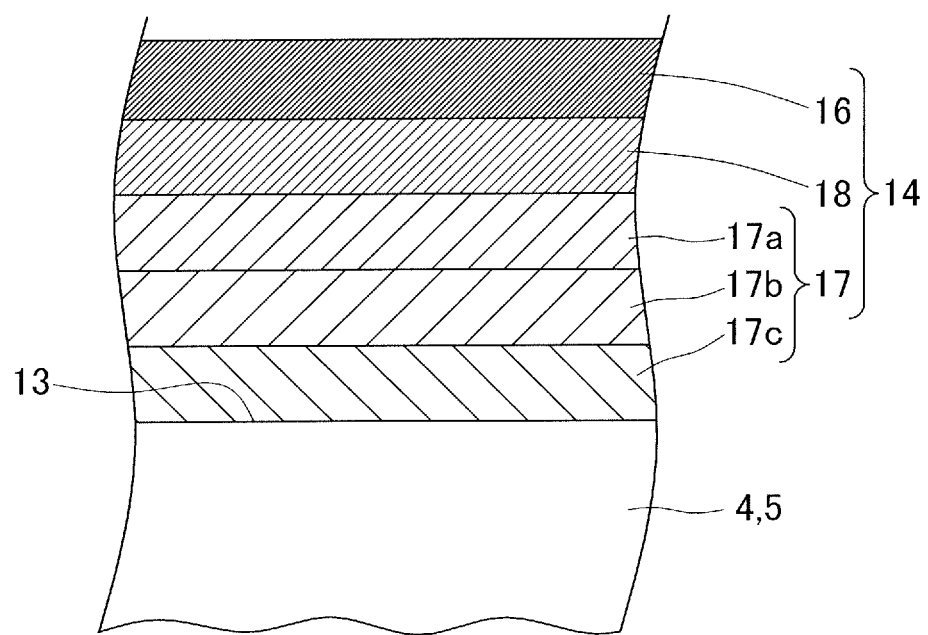
FIG. 8 is an enlarged cross-sectional view of a DLC coating of a roller, etc., of a double-row self-aligning roller bearing according to a fourth embodiment of the present invention.

In a double-row self-aligning roller bearing according to a fourth embodiment, as shown in FIG. 8, the rollers 4 and 5 in the respective rows may each have a DLC coating 14 on the roller rolling surface 13 thereof. In the DLC coating 14 in this example, a multi-layer structure having high adhesion to the roller 4 or 5, which is a base, is used. The DLC coating 14 has a surface layer 16, an intermediate layer 17, and a stress relaxation layer 18. The surface layer 16 is a film in which only graphite that is a solid target is used as a carbon supply source and which is mainly formed of DLC in which an amount of hydrogen mixed is reduced. The intermediate layer 17 is a layer that is formed between the surface layer 16 and the base and is mainly formed of at least Cr or W. The stress relaxation layer 18 is formed between the intermediate layer 17 and the surface layer 16.

The intermediate layer 17 has a structure including a plurality of layers having different compositions, and a three-layer structure of 17*a* to 17*c* is shown in FIG. 8. For example, a layer 17*c* mainly formed of Cr is formed on the surface of the base, a layer 17*b* mainly formed of W is formed on the layer 17*c*, and a layer 17*a* mainly formed of W and C is formed on the layer 17*b*. In FIG. 8, the three-layer structure is shown, but, as necessary, the intermediate layer 17 may include layers whose number is less than or greater than three.

By the layer 17*a* adjacent to the stress relaxation layer 18 being mainly formed of carbon and a metal that is the metal of which the layer 17*b* adjacent to the layer 17*a* at the other side is mainly composed, the adhesion between the intermediate layer 17 and the stress relaxation layer 18 can be improved. For example, in the case where the layer 17*a* is mainly formed of W and C, further improvement of the adhesion can be achieved by decreasing the contained amount of W and increasing the contained amount of C from the side at which the intermediate layer 17*b* mainly formed of W is present, toward the side at which the stress relaxation layer 18 mainly formed of C is present (composition gradient).

The stress relaxation layer 18 is a gradient layer that is mainly formed of C and in which the hardness thereof increases in a continuous or stepwise manner from the intermediate layer 17 side to the surface layer 16 side. Specifically, the stress relaxation layer 18 is a DLC gradient layer that is obtained by using a graphite target in a DBMS method and forming a film while increasing a bias voltage to the base in a continuous or stepwise manner. The reason why the hardness increases in a continuous or stepwise manner is that the distribution ratio of a graphite structure (SP2) and a diamond structure (SP3) in a DLC structure becomes biased due to the increase of the bias voltage such that the latter is increased.

The surface layer 16 is a film that is formed by extension of the stress relaxation layer 18 and mainly formed of DLC, particularly, a DLC film in which a contained amount of hydrogen in the structure thereof is reduced. Since the contained amount of hydrogen is reduced, the wear resistance is improved. To form such a DLC film, a method, in which, for example, a UBMS method is used and a raw material to be used in sputtering, hydrogen, and a compound containing hydrogen are not mixed in sputtering gas, is used.

Regarding the film forming method for the stress relaxation layer 18 and the surface layer 16, the case of using the DBMS method has been described, but any other publicly known film forming method can be adopted as long as it is a film forming method that allows the hardness to be changed in a continuous or stepwise manner. The sum of the film thicknesses of the multiple layers including the intermediate layer 17, the stress relaxation layer 18, and the surface layer 16 is preferably 0.5 μm to 3.0 μm. If the sum of the film thicknesses is less than 0.5 μm, the wear resistance and the mechanical strength are poor, and if the sum of the film thicknesses exceeds 3.0 μm, these layers are easily peeled off. Thus, such cases are not preferable.

In this example, the DLC coating 14 is provided only on the outer circumferential surface of each of the rollers 4 and 5, but a DLC coating 14 may be further provided on each end face of each of the rollers 4 and 5. In particular, in the case where a DLC coating 14 is provided on one end face of each of the rollers 4 and 5 guided by the intermediate flange 8 (FIG. 4), the one end face of each of the rollers 4 and 5 is hardly worn, so that the wear resistance of the rollers 4 and 5 can be further enhanced.

Insertion Slot 15

Figure 9:
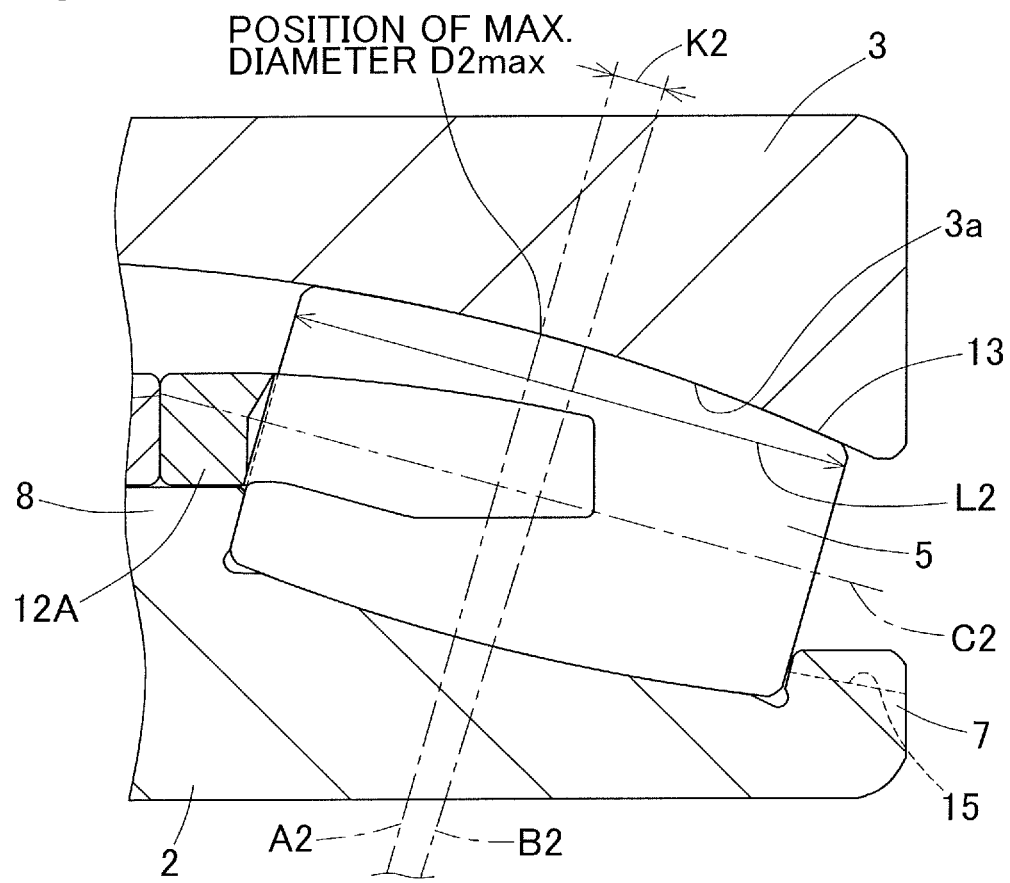
FIG. 9 is an enlarged cross-sectional view showing an insertion slot of an inner ring, etc., of a double-row self-aligning roller bearing according to a fifth embodiment of the present invention.
Figure 10:
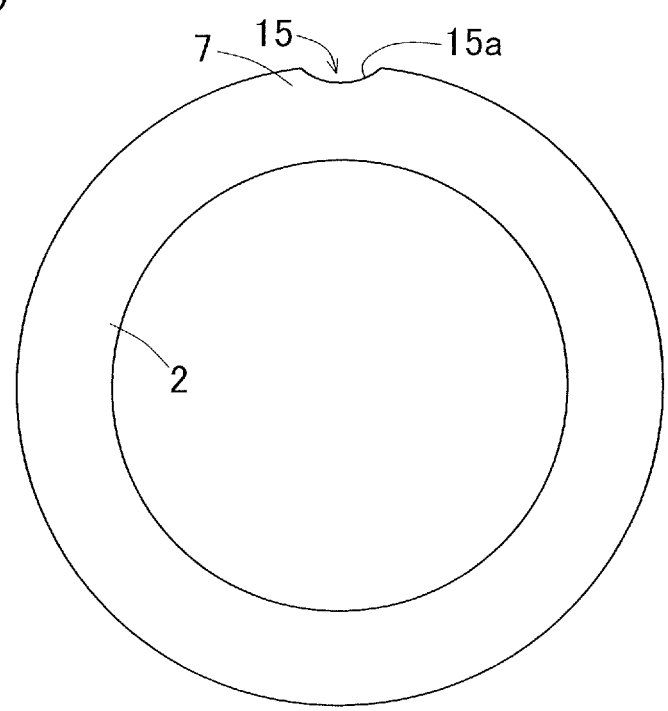
FIG. 10 is an end view of the insertion slot of the inner ring, etc., as seen from an axial direction.

In a double-row self-aligning roller bearing according to a fifth embodiment, as shown in FIG. 9, of the respective small flanges 6 and 7 (FIG. 4) of the inner ring 2, the small flange 7 that faces the axially outer end faces of the rollers 5 having the longer distance K2 from the center B2 of the roller length to the position A2 at which the maximum diameter is obtained may have an insertion slot 15 for inserting the rollers 5 into the bearing. As shown in FIG. 10, an insertion slot 15 having a circular arc shape is provided at one location in the circumferential direction on the small flange 7 of the inner ring 2. The radius of curvature of a circular arc 15a of the insertion slot 15 is set as appropriate in accordance with the maximum diameter of the rollers 5 (FIG. 9) to be inserted. In the case where such an insertion slot 15 is provided to the inner ring 2, fittability of the rollers 5 in the right row into the bearing can be further improved.

Figure 11:
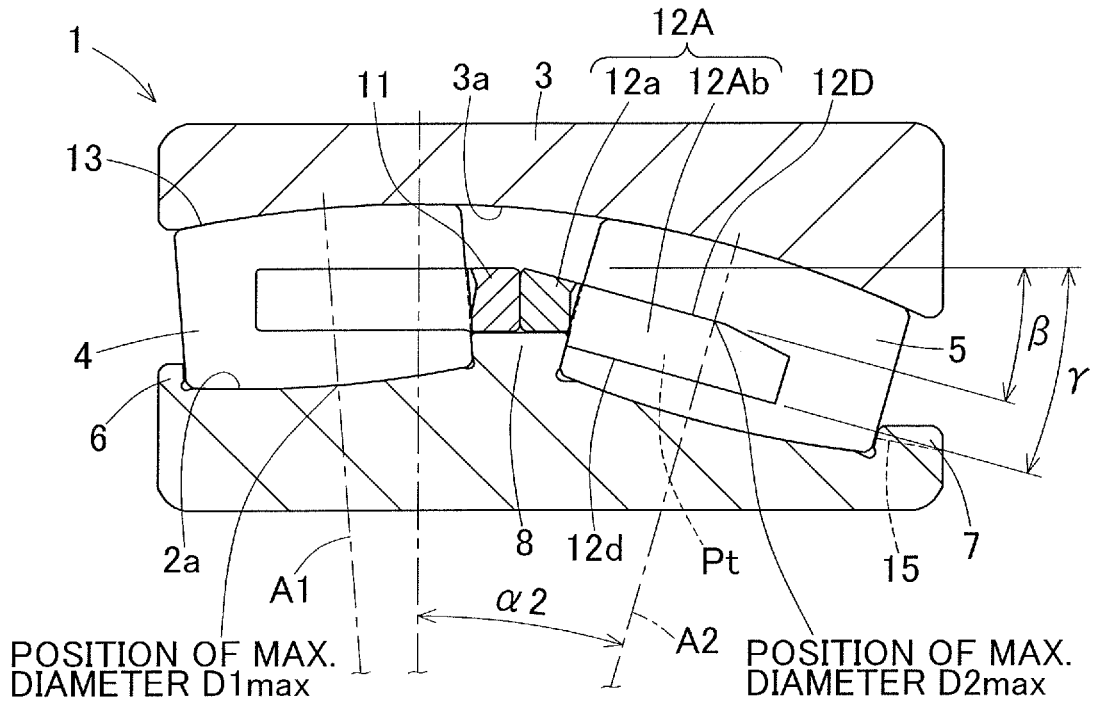
FIG. 11 is a cross-sectional view of a double-row self-aligning roller bearing according to a sixth embodiment of the present invention.

In the double-row self-aligning roller bearing according to the sixth embodiment, as shown in FIG. 11, the inclination angle $\beta$ of the radially outer surface 12D of each pillar portion 12Ab in the retainer 12A for the right row may be set within a range of greater than zero and not greater than the maximum diameter angle $\alpha2$ of the rollers 5 in the right row, and the inclination angle $\gamma$ of the radially inner surface 12d of each pillar portion 12Ab may be set so as to be equal to the inclination angle $\beta$ of the radially outer surface. The inclination angle $\beta$ in this example is set to an angle that is not greater than the maximum diameter angle $\alpha2$ and substantially close to the maximum diameter angle $\alpha2$. In addition, the radially inner surface of the pillar portion 12Ab is formed of only an inclined surface portion, and the above-described flat surface portion is not provided therein.

According to the configuration in FIG. 11, since the retainer 12A has the above-described inclination angle $\beta$, the pocket Pt surfaces of the retainer 12A are more assuredly maintained around the position of the pitch circle diameter of the rollers 5, so that the pocket Pt surfaces of the retainer 12A can smoothly and assuredly hold the maximum diameter positions of the rollers 5 during operation of the bearing. In addition, fitting of the longer rollers 5 in the right row can also be performed more easily.

Figure 12:
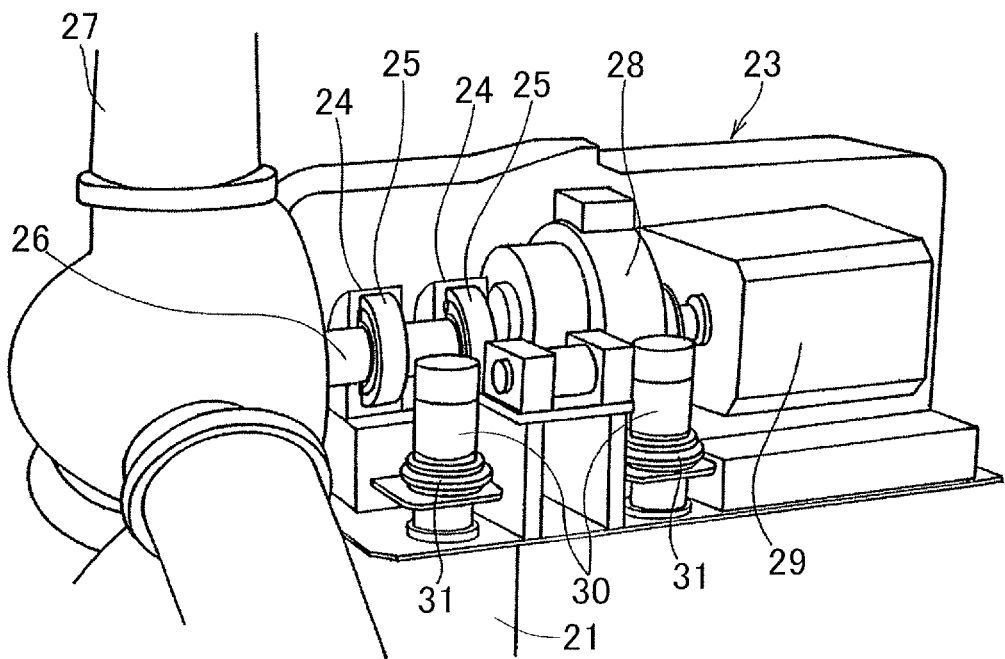
FIG. 12 is a partially cutaway perspective view of an example of a main shaft supporting device of a wind power generator.
Figure 13:
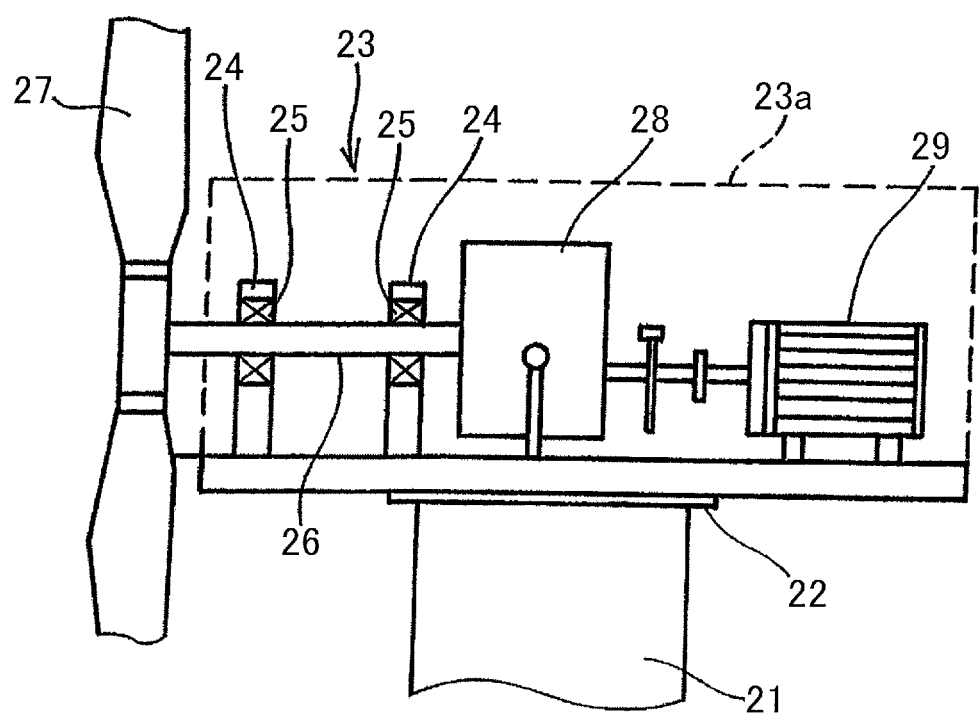
FIG. 13 is a cutaway side view of the main shaft supporting device.
Figure 14:
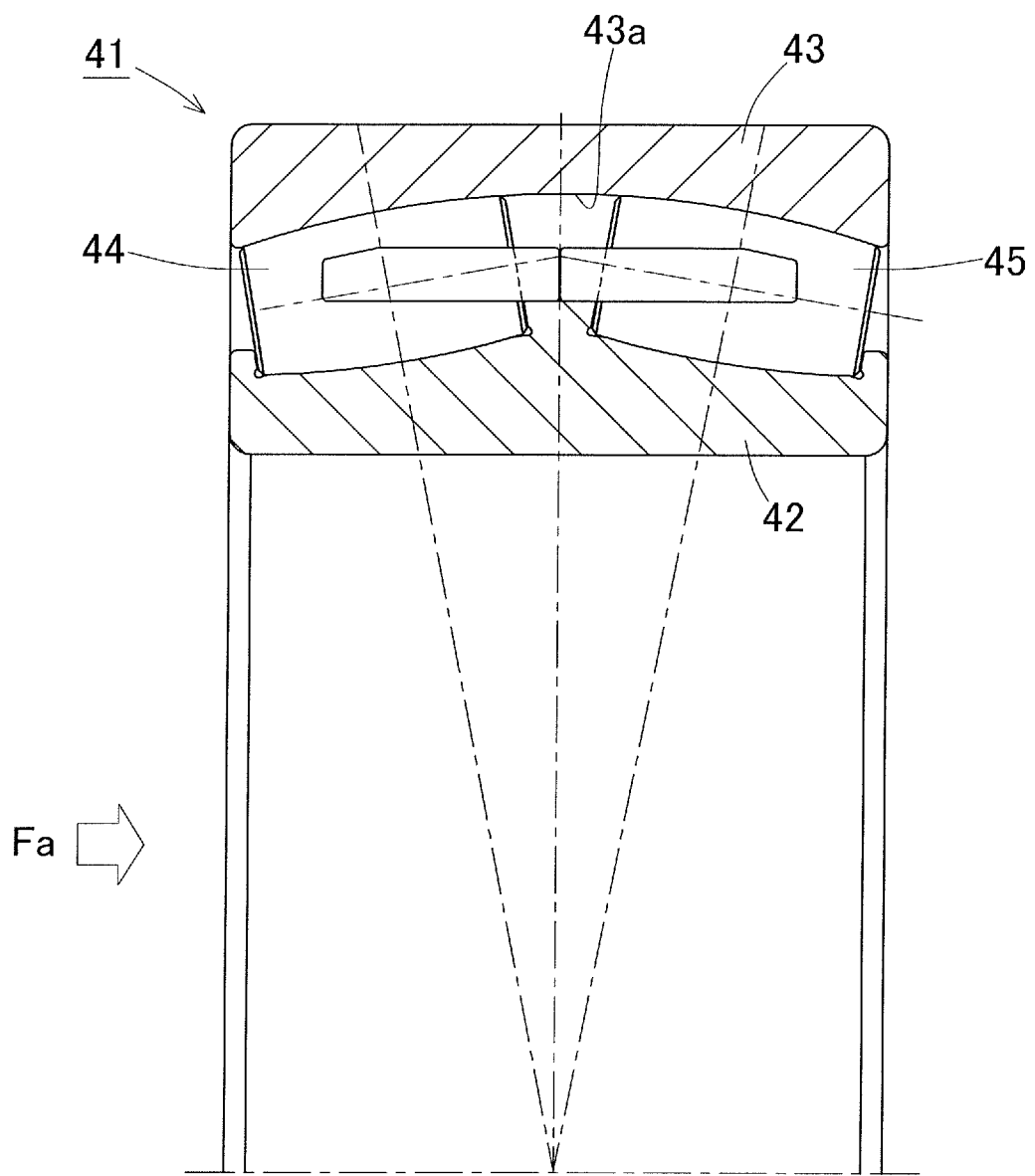
FIG. 14 is a cross-sectional view of a conventional general double-row self-aligning roller bearing.
Figure 15:
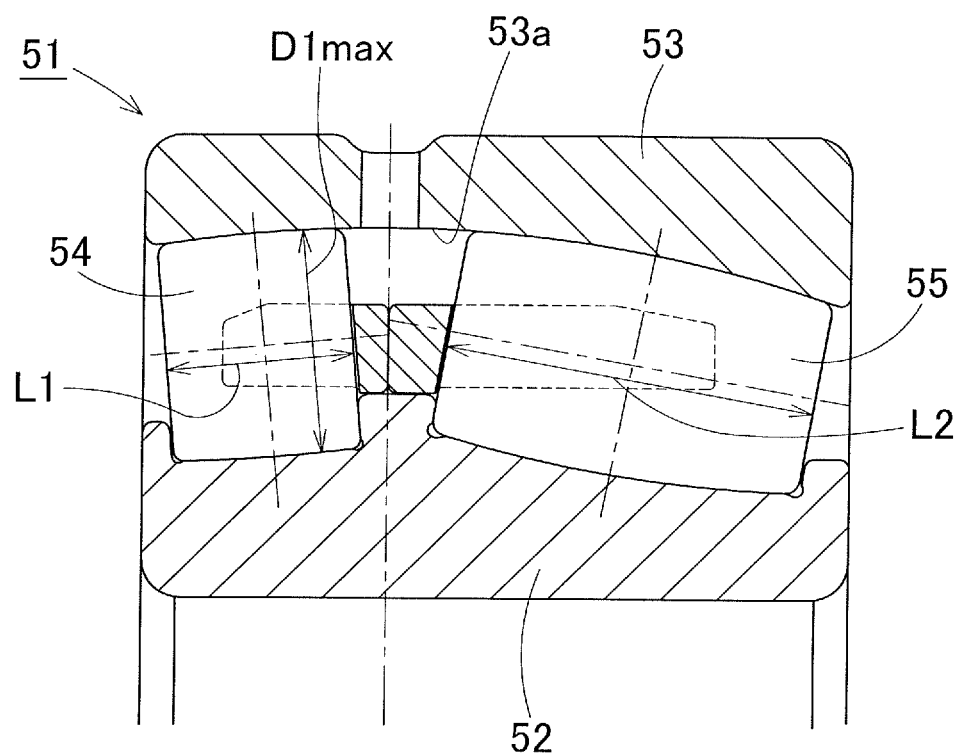
FIG. 15 is a cross-sectional view of a double-row self-aligning roller bearing of a first proposed example.
Figure 16:
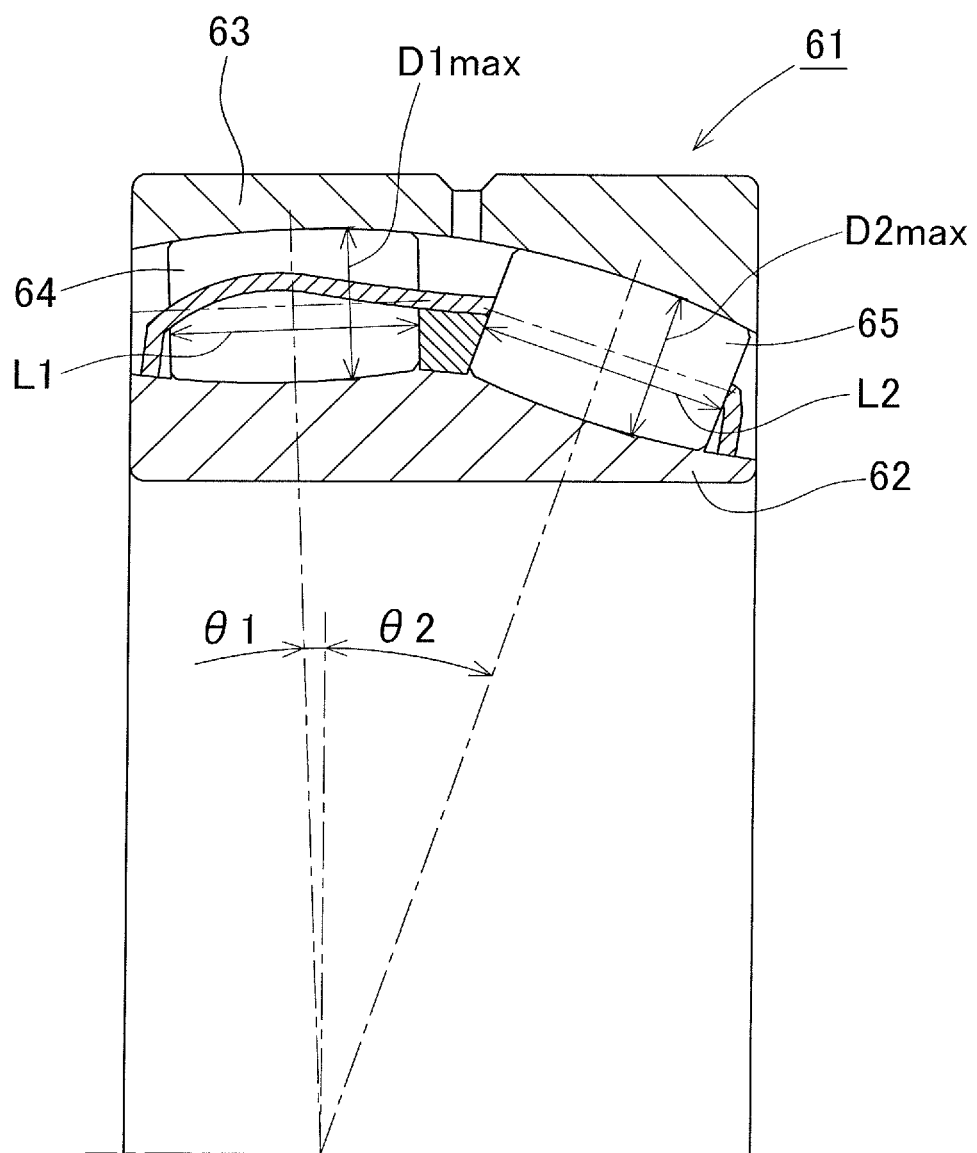
FIG. 16 is a cross-sectional view of a double-row self-aligning roller bearing of a second proposed example.

FIG. 12 and FIG. 13 show an example of a main shaft supporting device of a wind power generator. A casing 23a of a nacelle 23 is provided on a support stand 21 via a slewing ring bearing 22 (FIG. 13) so as to be horizontally slewable. A main shaft 26 is rotatably provided within the casing 23a of the nacelle 23 via main shaft supporting bearings 25 provided in bearing housings 24. Blades 27 as a swirler are mounted on a portion of the main shaft 26 that projects outside the casing 23a. The other end of the main shaft 26 is connected to a speed increaser 28, and an output shaft of the speed increaser 28 is connected to a rotor shaft of a generator 29. The nacelle 23 is slowed at an arbitrary angle via a speed reducer 31 by a slewing motor 30.

There are two main shaft supporting bearings 25 that are aligned in the illustrated example, but the number of main shaft supporting bearings 25 may be one. The double-row self-aligning roller bearing 1 of any of the embodiments described above is used as each main shaft supporting bearing 25. In this case, both a radial load and an axial load act on the row farther from the blades 27, and thus the rollers 5 having the larger contact angle $\theta2$ are used as the rollers in the row farther from the blades 27. Only the radial load mainly acts on the row closer to the blades 27, and thus the rollers 4 having the smaller contact angle $\theta1$ are used as the rollers in the row closer to the blades 27.

The present invention is not limited to the above-described embodiments, and various additions, changes, or deletions can be made without departing from the gist of the present invention. Therefore, these are construed as included within the scope of the present invention.

REFERENCE NUMERALS

1 . . . Double-row self-aligning roller bearing
2 . . . Inner ring
3 . . . Outer ring
3a . . . Raceway surface
4, 5 . . . Roller
6, 7 . . . Small flange
8 . . . Intermediate flange
11, 12, 12A . . . Retainer
11a, 12a . . . Annular portion
11b, 12b, 12Ab . . . Pillar portion
13 . . . Roller rolling surface
14 . . . DLC coating
15 . . . Insertion slot
26 . . . Main shaft
A1, A2 . . . Position at which maximum diameter of roller is obtained
B1, B2 . . . Center of roller length
Cw . . . Crowning
D1max, D2max . . . Maximum diameter of roller
K1, K2 . . . Distance from center of roller length to position at which maximum diameter of roller is obtained
L1, L2 . . . Roller length
$\theta1, \theta2$ . . . Contact angle

What is claimed is:
1. A double-row self-aligning roller bearing comprising:
an inner ring;
an outer ring having a spherical raceway surface; and
rollers in two rows juxtaposed to each other in a bearing width direction and interposed between the inner ring and the outer ring, each of the rollers in the two rows having an outer circumferential surface having a cross-sectional shape that matches the raceway surface of the outer ring,
wherein the rollers in the two rows have lengths equal to each other and maximum diameters equal to each other, and have different distances from centers of the roller lengths to positions at which the maximum diameters are obtained.
2. The double-row self-aligning roller bearing as claimed in claim 1, wherein, in the rollers in either row of the rollers in the two rows, the position at which the maximum diameter is obtained is shifted to an inner side in the bearing width direction with respect to the center of the roller length.
3. The double-row self-aligning roller bearing as claimed in claim 1, wherein, of the rollers in the two rows, the rollers having the longer distance from the center of the roller length to the position at which the maximum diameter is obtained have a larger contact angle than the rollers having the shorter distance.
4. The double-row self-aligning roller bearing as claimed in claim 1, wherein the double-row self-aligning roller bearing is used for supporting a main shaft of a wind power generator.

5. The double-row self-aligning roller bearing as claimed in claim 1, further comprising retainers configured to retain the rollers in the respective rows, wherein each retainer includes an annular portion that has an annular shape and is configured to guide axially inner end faces of the rollers in the row, and a plurality of pillar portions that extend in an axial direction from the annular portion and that are provided at predetermined intervals along a circumferential direction, pockets configured to retain the rollers are provided between those pillar portions, and one of the retainers configured to retain the rollers having the longer distance from the center of the roller length to the position at which the maximum diameter is obtained has an inclination angle by which a radially outer surface of each pillar portion is inclined radially inward from a proximal end side toward a distal end side.

6. The double-row self-aligning roller bearing as claimed in claim 1, wherein each of the rollers has a DLC coating on a roller rolling surface thereof.

7. The double-row self-aligning roller bearing as claimed in claim 1, wherein each of the rollers has a crowning at an end portion of a roller rolling surface thereof.

8. The double-row self-aligning roller bearing as claimed in claim 1, wherein the inner ring includes an intermediate flange that is provided on an outer circumferential surface of the inner ring between the rollers in the two rows and configured to guide the rollers in the two rows, and small flanges that are provided at opposite ends of the outer circumferential surface, respectively, and that face axially outer end faces of the rollers in the respective rows, and one small flange of the respective small flanges of the inner ring, that faces the axially outer end faces of the rollers having the longer distance from the center of the roller length to the position at which the maximum diameter is obtained has an insertion slot for inserting the rollers into the bearing.

* * * * *